(12) United States Patent
Ou (10) Patent No.: US 9,567,795 B2
(45) Date of Patent: Feb. 14, 2017

(54) FRAME WITH SEGMENTS THAT ARE FLUSH WITH EACH OTHER

(71) Applicant: Frame Art Co., Ltd., New Taipei (TW)

(72) Inventor: Ming-Lang Ou, New Taipei (TW)

(73) Assignee: Frame Art Co., Ltd (TW)

( * ) Notice: Subject to any disclaimer, the term of this patent is extended or adjusted under 35 U.S.C. 154(b) by 0 days.

(21) Appl. No.: 14/876,759

(22) Filed: Oct. 6, 2015

(65) Prior Publication Data

US 2017/0009792 A1 Jan. 12, 2017

(30) Foreign Application Priority Data

Jul. 8, 2015 (TW) .............................. 104210993 U (51) Int. Cl.
| | |
|---|---|
| *F16B 7/18* | (2006.01) |
| *E06B 3/972* | (2006.01) |
| *E06B 1/36* | (2006.01) |
| *E06B 1/52* | (2006.01) |
| *E06B 3/08* | (2006.01) |
| *A47G 1/06* | (2006.01) |
| *E06B 3/968* | (2006.01) |

(52) U.S. Cl.
CPC .............. *E06B 3/9725* (2013.01); *A47G 1/06* (2013.01); *E06B 1/36* (2013.01); *E06B 1/52* (2013.01); *E06B 3/08* (2013.01); *E06B 3/968* (2013.01); *E06B 3/9682* (2013.01); *E06B 3/972* (2013.01); *F16B 7/187* (2013.01)

(58) Field of Classification Search
CPC .......... E06B 3/968; E06B 3/9682; E06B 1/52; E06B 1/36; E06B 3/08; E06B 3/972; E06B 3/9725; F16B 7/187; A47G 1/06

USPC ....................... 52/213, 215, 216, 217, 656.1, 656.5,52/656.2, 656.9
See application file for complete search history.

(56) References Cited

U.S. PATENT DOCUMENTS

| | | | | | |
|---|---|---|---|---|---|
| 3,534,490 | A | * | 10/1970 | Herbert ................ | A47G 1/0605 40/782 |
| 3,546,842 | A | * | 12/1970 | Blum ........................ | E04B 9/12 40/782 |
| 3,698,114 | A | * | 10/1972 | Hirsch ................ | A47G 1/0605 40/757 |
| 3,736,684 | A | * | 6/1973 | Grad .................... | A47G 1/0605 40/782 |
| 3,899,258 | A | * | 8/1975 | Matthews ................ | E06B 1/32 403/292 |
| 3,965,601 | A | * | 6/1976 | Nielsen ................ | A47G 1/0605 40/782 |
| 4,023,293 | A | * | 5/1977 | Murray .................... | A47G 1/10 40/782 |

(Continued)

*Primary Examiner* — Brent W Herring
(74) *Attorney, Agent, or Firm* — Bruce Stone LLP; Joseph A. Bruce (57) ABSTRACT

A frame with segments that are in flush with each other is disclosed. The frame of the present invention comprises a plurality of segments, a plurality of outer retaining units and a plurality of inner retaining units. The segments are connected together to form a frame. Each outer retaining unit is disposed on the rear outer side of the juncture of each pair of neighboring segments. Each inner retaining unit is disposed on the rear inner side of the juncture of each pair of neighboring segments. In this manner, each pair of neighboring segments may be tightly joined together and the segments of the frame may be in flush with each other.

5 Claims, 5 Drawing Sheets

(56) References Cited

U.S. PATENT DOCUMENTS

| | | | | |
|---|---|---|---|---|
| 4,122,617 A * | 10/1978 | Nielsen | A47G 1/0605 | 40/785 |
| 4,240,765 A * | 12/1980 | Offterdinger | E06B 3/9765 | 29/897.312 |
| 4,368,584 A * | 1/1983 | Logan | A47G 1/0605 | 40/759 |
| 4,380,110 A * | 4/1983 | Harig | A47G 1/10 | 228/142 |
| 4,718,184 A * | 1/1988 | Sherman | A47G 1/10 | 40/785 |
| 4,747,248 A * | 5/1988 | Fahs | E06B 3/9636 | 403/401 |
| 5,046,791 A * | 9/1991 | Kooiman | A47B 47/0025 | 312/265.1 |
| 5,157,885 A * | 10/1992 | Wertitsch | E06B 3/22 | 403/402 |
| 5,375,383 A * | 12/1994 | Lin | E06B 1/522 | 49/505 |
| 5,692,333 A * | 12/1997 | McClave | A47G 1/10 | 40/785 |
| 6,339,891 B1 * | 1/2002 | Cox | A47G 1/10 | 40/782 |
| 6,382,866 B1 * | 5/2002 | Zihlmann | F16B 7/0473 | 403/252 |
| 6,513,288 B1 * | 2/2003 | MacDonald | E04B 2/7435 | 160/137 |
| 7,845,135 B2 * | 12/2010 | Sibbett | E06B 3/9687 | 403/295 |
| 9,091,119 B2 * | 7/2015 | Kim | E06B 3/9636 | |
| 2005/0193680 A1 * | 9/2005 | Wang | E06B 3/9688 | 52/656.9 |
| 2012/0279166 A1 * | 11/2012 | Valler | E06B 3/16 | 52/656.2 |
| 2014/0360124 A1 * | 12/2014 | Kim | E06B 3/9636 | 52/656.9 |
| 2015/0121788 A1 * | 5/2015 | Kim | E06B 3/22 | 52/309.1 |

* cited by examiner

FRAME WITH SEGMENTS THAT ARE FLUSH WITH EACH OTHER

CROSS-REFERENCE TO RELATED APPLICATION

The present application claims priority from Taiwan Patent Application No. 104210993, filed on Jul. 8, 2015, which are hereby incorporated by reference in their entirety.

BACKGROUND OF THE INVENTION

1. Field of the Invention

The invention generally relates to a frame. More particularly, the invention relates to a frame formed by segments that are in flush with each other.

2. Description of the Prior Art

Frames may be used as photo frames, picture frames, door frames, window frames, etc. Photo and picture frames are used mainly for embellishment; they may be used to enable photos and pictures to be easier to carry around; sometimes, they are used to protect photos and pictures; they may even be used for the decorative purpose like a piece of furniture. Photo and picture frames may be made of wood, plastic, metal or glass. A rectangular photo or picture frame comprises four segments; a hexagonal picture frame comprises six segments. In particular, regarding photo and picture frames made of metal, their segments are not easily tightened together and are often not in flush with each other; some of them may become loose and fall apart easily. This adversely affects the appearance and utility of the frame.

Aluminum is often used to make frames, window frames and furniture. Regarding conventional aluminum frames, they are formed by straight segments, which are then joined by screws. Also, rollers are used to allow them to roll along door rails or window tracks. These aluminum-made frames have many disadvantages: junctions between the segments may become loose; cracks may form between the segments; areas near fasteners on a segment may deform.

From the aforesaid, we can see that these disadvantages need to be eliminated.

SUMMARY OF THE INVENTION

An object of the present invention is to provide a frame that can eliminate the disadvantages of prior art frames by allowing the segments to be connected tightly together and the segments to be in flush with one another. Another object of the present invention is to provide a frame that is sturdier. A third object is to embellish the appearance of the frame.

To reach these objectives, the frame of the present invention is provided. The frame of the present invention comprises a plurality of segments, a plurality of outer retaining units and a plurality of inner retaining units. The segments are connected together to form a frame. Each outer retaining unit is disposed on the rear outer side of the juncture of each pair of neighboring segments. Each inner retaining unit is disposed on the rear inner side of the juncture of each pair of neighboring segments. In this manner, each pair of neighboring segments may be tightly joined together and the segments of the frame are flush with each other.

An outer connective slot is externally provided on each segment. As a pair of neighboring segments is connected, an outer retaining unit may join them together.

An inner connective slot is internally provided on each segment. As a pair of neighboring segments is connected, an inner retaining unit may join them together.

A plurality of access holes are provided on the back side of each segment to allow a tool to be used to reach into of the segment to fasten fasteners.

Each outer retaining unit comprises an outer upper retaining piece and a plurality of outer threaded fasteners. One or more outer threaded holes are provided in each outer upper retaining piece. Each outer threaded fastener is screwed into an outer threaded hole. Each outer threaded fastener downwardly pushes against the bottom of the corresponding outer connective slot and upwardly pushes against the upper edge of the corresponding outer connective slot so as join a pair of neighboring segments together.

Each outer retaining unit further comprises an outer lower retaining piece. Each outer upper retaining piece is disposed inside the corresponding outer connective slot. Each outer threaded fastener which is screwed into an outer threaded hole. Therefore, each outer threaded fastener downwardly pushes against the corresponding outer lower retaining piece, which in turn exerts a downward force onto the bottom of the corresponding outer connective slot. Also, each outer threaded fastener upwardly pushes against the corresponding outer upper retaining piece so that the latter upwardly pushes against the upper edge of the corresponding outer connective slot. In this manner, each outer retaining unit may firmly join two neighboring segments together.

Each inner retaining unit comprises an inner upper retaining piece and a plurality of inner threaded fasteners. One or more threaded holes are provided in each inner upper retaining piece. Each inner threaded fastener is screwed into the corresponding threaded hole. Each fastener presses against the bottom of the inner connective slot and pushes the corresponding inner upper retaining piece upwardly to push upwardly against the upper edge of the inner connective slot so as to join the segments together.

Each inner retaining unit further comprises an inner lower retaining piece, which is disposed at the bottom of the corresponding inner connective slot. Each inner threaded fastener is screwed into the corresponding threaded hole and pushes downwardly against the corresponding inner lower retaining piece to push downwardly against the bottom of the corresponding inner connective slot. Also, each inner threaded fastener causes each inner upper retaining piece to push upwardly against the upper edge of the inner connective slot.

The frame further comprises auxiliary retaining units, each of which is disposed on and presses against the rear side of the juncture of a pair of neighboring segments.

An auxiliary connective slot is provided on the rear side of each segment. As a segment connects with a neighboring segment, the corresponding two auxiliary connective slots are joined together and an auxiliary retaining unit connects two neighboring auxiliary connective slots.

Each auxiliary retaining unit comprises an auxiliary upper retaining piece and a plurality of auxiliary threaded fasteners. One or more threaded holes are provided in each auxiliary upper retaining piece. Each auxiliary threaded fastener is screwed into an auxiliary threaded hole. Each auxiliary upper retaining piece upwardly pushes against the upper edge of the auxiliary connective slot. In this manner, the neighboring segments may be tightly joined together.

Each auxiliary retaining unit further comprises an auxiliary lower retaining piece. Each auxiliary threaded fastener is screwed into an auxiliary threaded hole so that the auxiliary threaded fastener downwardly pushes against the corresponding auxiliary lower retaining piece and thus against the rear side of the corresponding segment. Each auxiliary threaded fastener causes the corresponding auxiliary upper retaining piece to upwardly push against the upper edge of the auxiliary connective slot. In this manner, the neighboring segments may be tightly joined together.

The frame of the present invention has at least one of the following two advantages:
(1) A plurality of outer retaining units enable each pair of neighboring segments to be tightly connected.
(2) A plurality of inner retaining units allow each pair of neighboring segments to be connected on the rear side of their juncture, enabling each pair of neighboring segments to be tightly connected and eliminating difference in height on the front view between the segments, thus embellishing the appearance of the frame.

DETAILED DESCRIPTION OF THE PREFERRED EMBODIMENT

Unless otherwise specified, all the technical and scientific terms contained in the following description are defined as their common definitions. Although several preferred embodiments of the present invention will be described in detail hereinafter, it should be understood that the preferred embodiments are to be regarded in an illustrative manner rather than a restrictive manner, and all variations and modifications of the basic inventive concepts herein taught still fall within the scope of the present invention. All materials used in the frame of the present invention are easily available from the market.

In the following description, the frame of the present invention will be elaborated with reference to the drawings.

Figure 1:
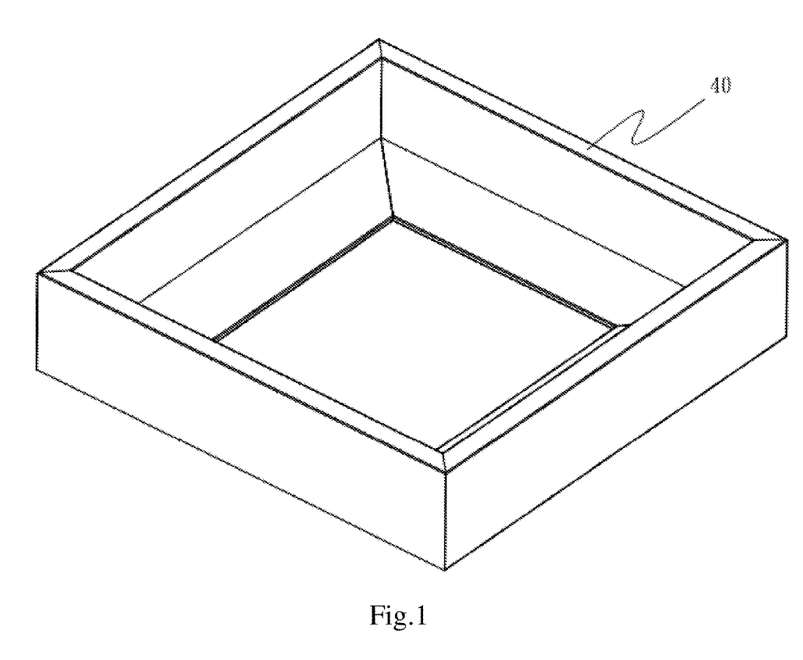
FIG. 1 is a perspective view of an embodiment of the frame of the present invention.
Figure 2:
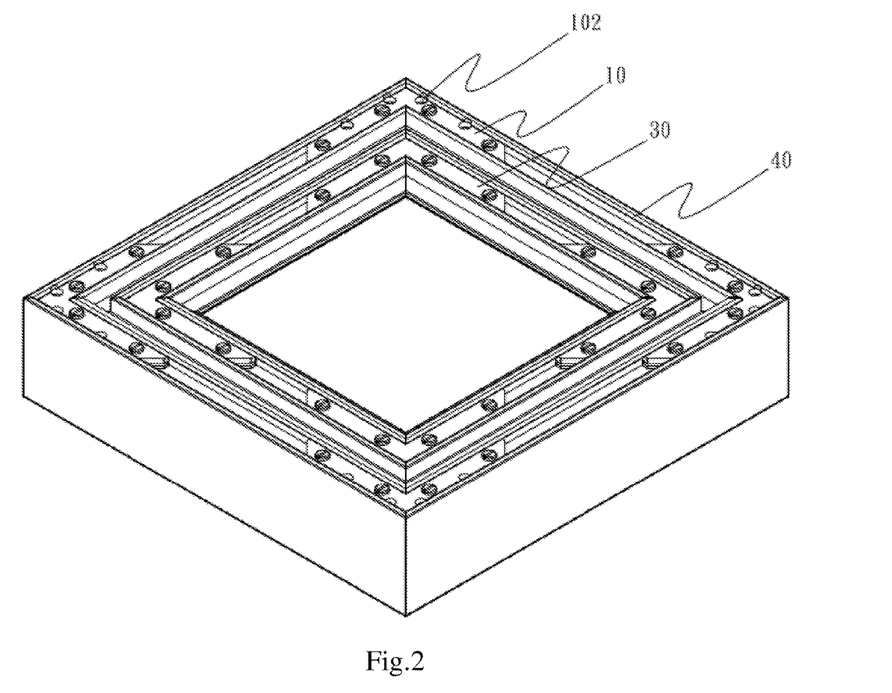
FIG. 2 is another perspective view of an embodiment of the frame of the present invention.
Figure 3:
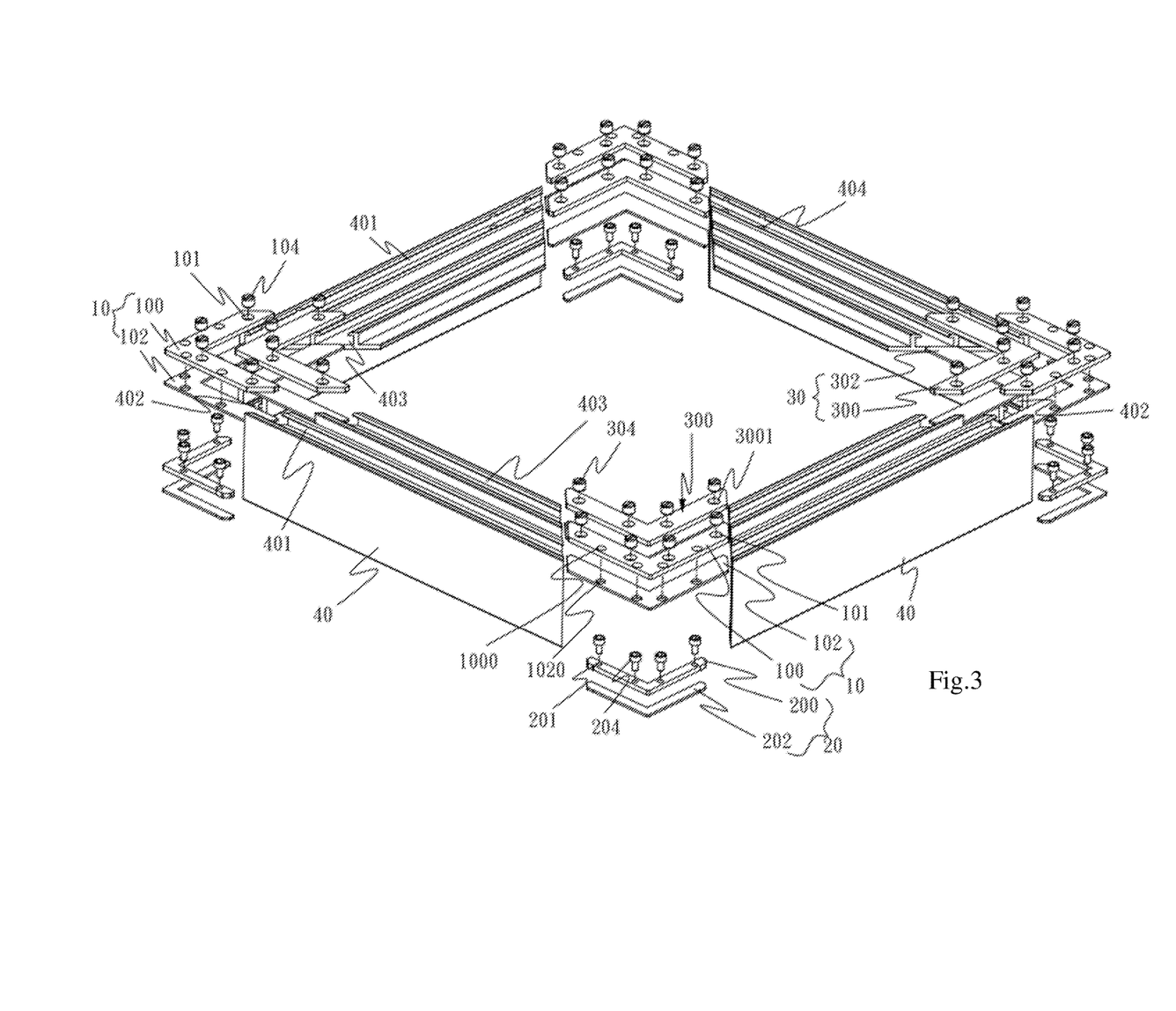
FIG. 3 is an exploded view of an embodiment of the frame of the present invention.
Figure 4:
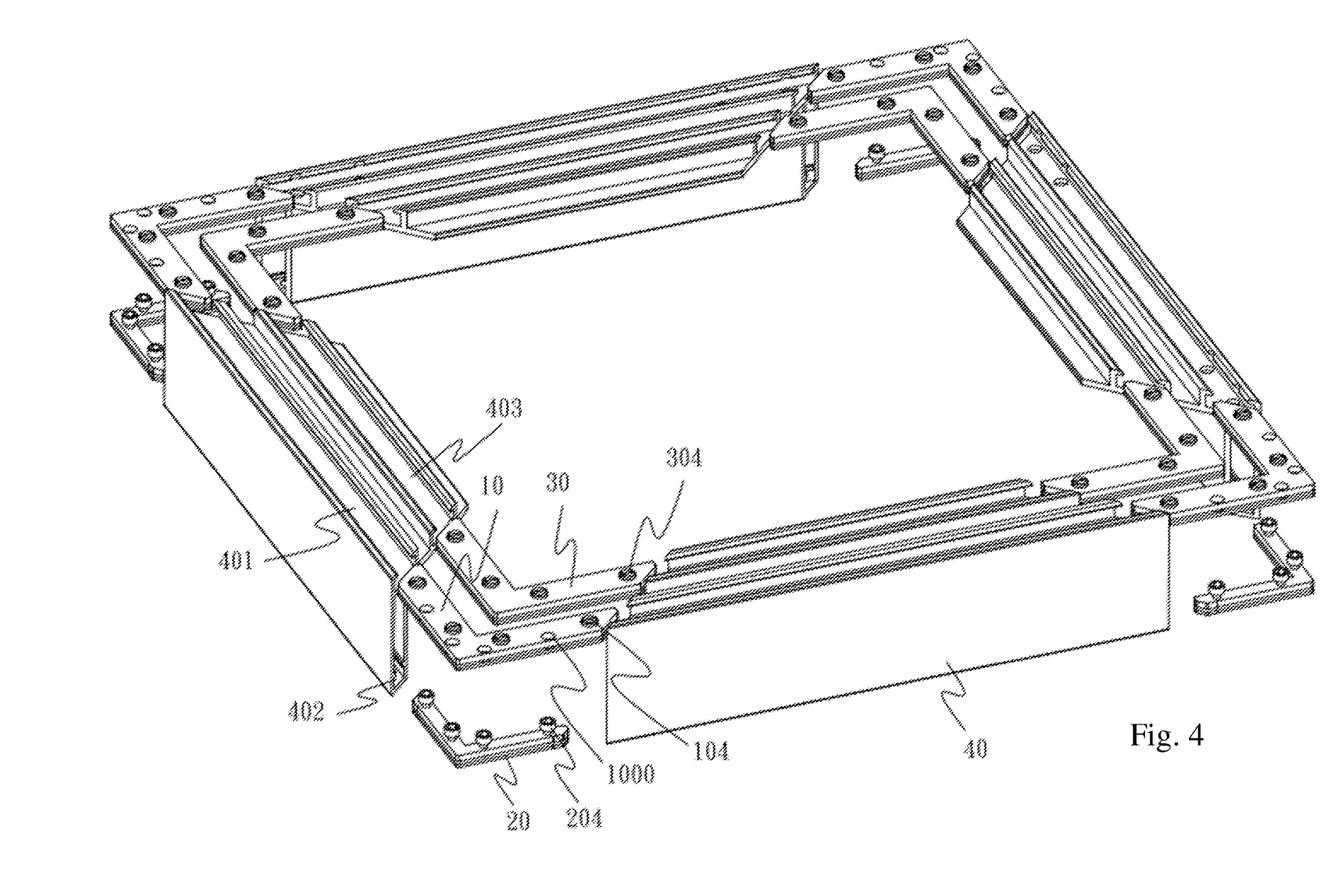
FIG. 4 is another exploded view of an embodiment of the frame of the present invention.
Figure 5:
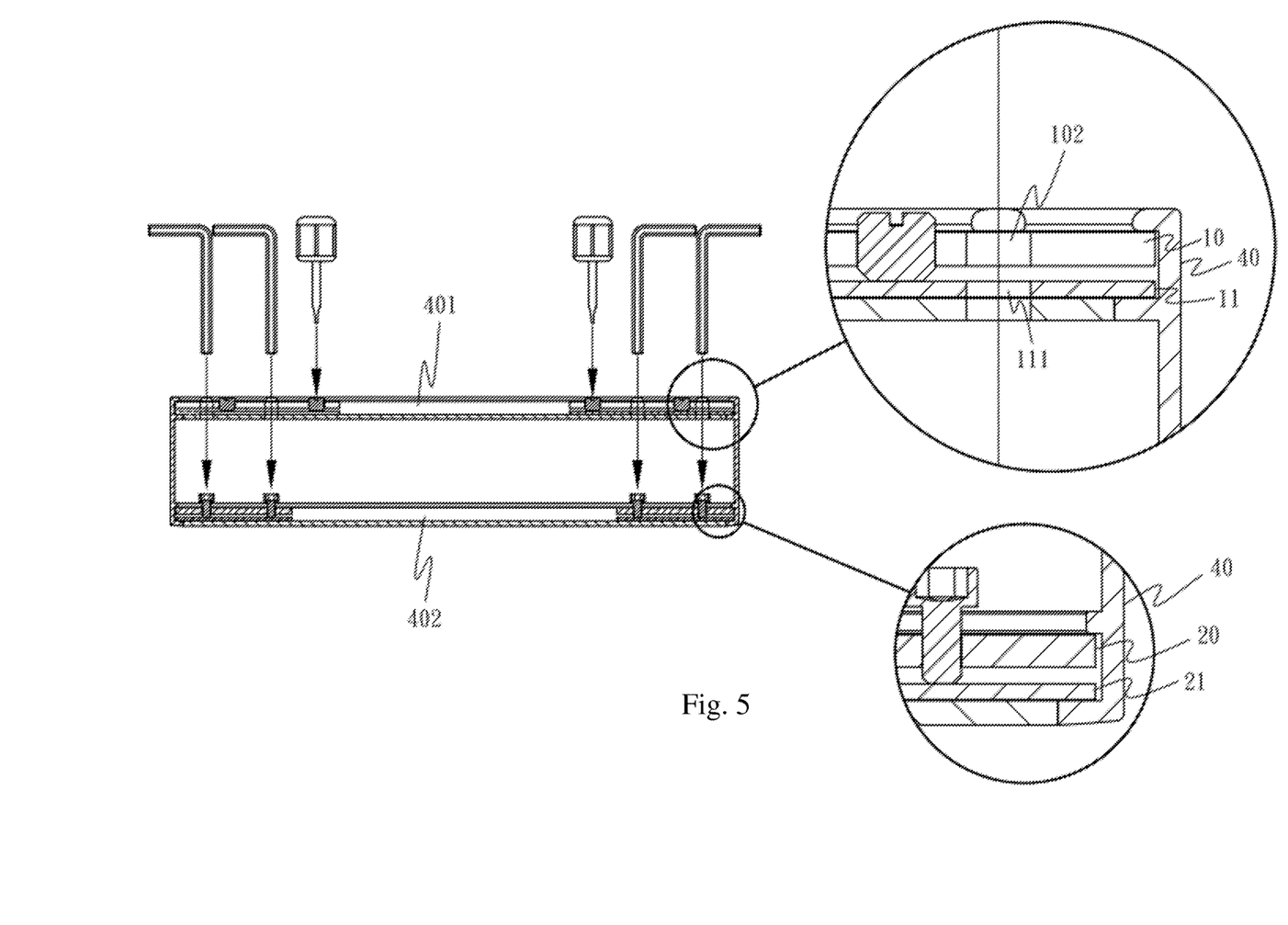
FIG. 5 is a sectional view of an embodiment of the frame of the present invention.

As illustrated from FIGS. 1 to 5, which illustrate embodiments of the frame of the present invention, the frame of the present invention comprises a plurality of segments 40, a plurality of outer retaining units 10 and a plurality of inner retaining units 20. Each outer retaining unit 10 is disposed on the rear outer side of the juncture of two neighboring segments 40. Each inner retaining unit 20 is disposed on the inner front side of the juncture of two neighboring segments 40. In this manner, each pair of neighboring segments 40 may be tightly joined together and the segments 40 of the frame are in flush with each other on the front view. In this embodiment, the four segments 40 form a rectangular structure and in each corner, two segments 40 form a 90-degree angle. The four segments 40 may be made of, but not limited to, aluminum, iron or steel.

In this embodiment, each segment 40 is provided with an outer connective slot 401, which may connect with a corresponding outer retaining unit 10. Each outer connective slot 401 has a U-shape and either of its two ends has an inverted L-shape to prevent accidental disengagement of the corresponding outer retaining unit 10. Also, each segment 40 is provided with an inner connective slot 402, which may connect with a corresponding inner retaining unit 20. Each inner connective slot 402 is disposed inside the corresponding segment 40 and is facing the front side. From the above, we can see that each neighboring pair of the segments 40 is connected through the engagement or connection between an outer retaining unit 10 and the corresponding outer connective slot 401 and the engagement or connection between an inner retaining unit 20 and the corresponding inner connective slot 402.

In this embodiment, each outer retaining unit 10 is fixed on outer face of the back of the corresponding segment 40 and comprises an outer upper retaining piece 100 and an outer lower retaining piece 102. A plurality of outer threaded holes 101 are provided in each outer upper retaining piece 100. In assembly, first, each outer upper retaining piece 100 is aligned with the corresponding outer lower retaining piece 102 and then a plurality of outer threaded fasteners 104 are used to connect the former with the latter through the outer threaded holes 101. In this process, each fastener 104 may push the outer upper retaining piece 100 upwardly and push the outer lower retaining piece 102 downwardly—so that the outer lower retaining piece 102 would in turn press against the bottom of the corresponding outer connective slot 401. In this manner, the outer portions of two neighboring segments 40 may be connected.

A plurality of outer connective slot holes 404 are provided on each outer connective slot 401. Also, each outer upper retaining piece 100 is provided with a plurality of threaded holes 1000 and each lower piece 102 is provided with a plurality of threaded holes 1020. Diameters of the holes 1000 and 1020 should be larger than the diameter of the tool (such as screwdriver, hex key or Torx key). Therefore, a person may use a tool to access and fasten each inner retaining unit 20 through the outer connective slot holes 404, threaded holes 1000 and threaded holes 1020.

In this embodiment, each inner retaining unit 20 is fixed onto the corresponding inner connective slot 402. Each inner retaining unit 20 comprises an inner upper retaining piece 200 and an inner lower retaining piece 202. A plurality of threaded holes 201 are provided in each inner upper retaining piece 200. Therefore, a person may use a tool to access and fasten fasteners onto the threaded holes 201 through the outer connective slot holes 404, threaded holes 1000 and threaded holes 1020.

In assembly, with each inner upper retaining piece 200 aligned with the corresponding lower retaining piece 202, as we use a tool to screw an inner threaded fastener 204 into the corresponding hole 201, the fastener would push the inner upper retaining piece 200 upwards and would push the inner lower retaining piece 202 downwards. Now, the lower retaining piece 202 would in turn press against the bottom of the inner connective slot 402. In this manner, all segments 40 may be installed and in flush with each other.

Because in this embodiment, the frame is rectangular, either end of each segment has a 45-degree shape. Also, ends of the outer upper retaining pieces 100, outer lower pieces 102, inner upper retaining pieces 200 and lower retaining pieces 202 have the same 45-degree shape. Length of either arm of the outer upper retaining pieces 100, outer lower pieces 102, inner upper retaining pieces 200 and lower retaining pieces 202 is not greater than that of the segments. Width of either arm of the outer upper retaining pieces 100, outer lower retaining pieces 102, inner upper retaining pieces 200 and inner lower retaining pieces 202 is not greater than that of each outer connective slot 401 or each inner connective slot 402. Therefore, the outer upper retaining pieces 100 and outer lower pieces 102 may be installed inside the outer connective slots 401; the inner upper retaining pieces 200 and lower retaining pieces 202 may be installed inside the inner connective slots 402 so as to tightly connect the segments 40 together.

In this embodiment, the outer threaded fasteners 104 and inner threaded fasteners 204 may be, but not limited to, Phillips screws, slot screws, hex screws or star screws as well as any types of fasteners that can fasten the outer retaining units and inner retaining units onto each pair of neighboring segments 40. Both the outer threaded holes 101 and inner threaded holes 201 are threaded so that each outer upper retaining piece 100 would be pushed upwards as a fastener is screwed into the outer threaded holes 101 and so that each inner upper retaining piece 200 would be pushed upwards as a fastener is screwed into the inner threaded holes 201. Length of the outer threaded fasteners 104 is greater than the width of the outer upper retaining pieces 100; length of the inner threaded fasteners 204 is greater than the width of the inner upper retaining pieces 200.

In another embodiment of the present invention, there is an addition of auxiliary connective units 403. Each auxiliary connective unit 403 abuts and is parallel to the corresponding outer connective slot 401. Each auxiliary connective unit 403 may be disposed inside or outside the corresponding outer connective slot 401. Each auxiliary connective slot 403 has a U-shape and either of its two ends has an inverted L-shape to prevent accidental disengagement of the corresponding retaining unit.

Each auxiliary connective unit 403 may connect with the corresponding auxiliary retaining units 30, each of which comprises an auxiliary upper retaining piece 300 and an auxiliary lower retaining piece 302. A plurality of auxiliary threaded holes 3001 are provided in each auxiliary upper retaining piece 300.

Because in the second embodiment, the frame is rectangular, either end of each segment has a 45-degree shape. Also, ends of the auxiliary upper retaining pieces 300 and auxiliary lower retaining pieces 302 have the same 45-degree shape. Length of either arm of each the auxiliary upper retaining piece 300 or each auxiliary lower retaining piece 302 is not greater than that of each segment 40. Width of either arm of each the auxiliary upper retaining piece 300 or each auxiliary lower retaining piece 302 is not greater than that of the auxiliary connective unit 403. Therefore, each the auxiliary upper retaining piece 300 and each auxiliary lower retaining piece 302 may be installed inside the corresponding auxiliary connective unit 403 so as to connect the segments 40 together.

In assembly, with each auxiliary upper retaining piece 300 aligned with the corresponding auxiliary lower retaining piece 302, as we use a tool to screw an auxiliary threaded fastener 304 into the corresponding auxiliary threaded hole 3001, the fastener would push the auxiliary upper retaining piece 300 upwards and would push the auxiliary lower retaining piece 302 downwards because the length of the auxiliary threaded fastener 304 is greater than the width of each auxiliary upper retaining piece 300. Now, the auxiliary lower retaining piece 302 would in turn press against the bottom of the segment 40. Also, the fastener 304 causes the auxiliary upper retaining piece 300 to push the upper edge of the corresponding auxiliary connective unit 403 upwards. In this manner, the segments may be tightly connected with each other.

In the third embodiment, there are no outer lower retaining pieces 102, inner lower retaining pieces 202 and auxiliary lower retaining pieces 302. Instead, each outer threaded fastener 104 presses against the bottom of the outer connective slot 401; each inner threaded fastener 204 presses against the bottom of the inner connective slot 402; each auxiliary threaded fastener 304 presses against the bottom of the auxiliary connective slot 403. However, forces so directly exerted are more uneven and may cause damages to the bottom of the outer connective slot 401, inner connective slot 402 and auxiliary connective slot 403. Therefore, it is preferred to provide the outer lower retaining pieces 102, inner lower retaining pieces 202 and auxiliary lower retaining pieces 302.

The frame of the present invention has the following two advantages:

(1) A plurality of outer retaining units 10 enable each pair of neighboring segments 40 to be tightly connected.

(2) A plurality of inner retaining unit 20 allow each pair of neighboring segments 40 to be connected on the rear side of their juncture, enabling each pair of neighboring segments 40 to be tightly connected and eliminating difference in height on the front view between the segments 40, thus embellishing the appearance of the frame.

What is claimed is:

1. A frame with segments that are flush with each other, comprising:
    a plurality of segments, with each pair of neighboring segments connected to form the frame;
    a plurality of outer retaining units, with each outer retaining unit fitted to and pressing against the rear outer side of the juncture of two neighboring segments; and
    a plurality of inner retaining units, with each inner retaining unit fitted to and pressing against the rear inner side of the juncture of two neighboring segments,
    wherein an inner connective slot is internally provided on each segment, characterized in that as a pair of neighboring segments is connected, an inner retaining unit may join them together;
    wherein each inner retaining unit comprises:
    an inner upper retaining piece, wherein one or more threaded holes are provided in each inner upper retaining piece;
    an inner lower retaining piece, disposed between the corresponding inner upper retaining piece and the corresponding inner connective slot; and
    a plurality of inner threaded fasteners, each of which is screwed into the corresponding threaded hole, characterized in that each fastener presses the inner lower retaining piece against the bottom of the inner connective slot and pushes the corresponding inner upper retaining piece upwardly to push upwardly against the upper edge of the inner connective slot so as to join the segments together;
    wherein an outer connective slot is externally provided on each segment, characterized in that as a pair of neighboring segments is connected, an outer retaining unit may join them together;
    wherein each outer retaining unit comprises an outer upper retaining piece, wherein one or more outer threaded holes are provided in each outer upper retaining piece; and
    a plurality of outer threaded fasteners, each of which is screwed into a respective one of the outer threaded holes, characterized in that each outer threaded fastener downwardly presses against the bottom of the corresponding outer connective slot and upwardly presses against the upper edge of the corresponding outer connective slot so as to join a pair of neighboring segments together;
    wherein a plurality of outer connective slot holes are provided on each outer connective slot, characterized in that each outer upper retaining piece is provided with a plurality of upper piece holes.

2. The frame as in claim 1, further comprising auxiliary retaining units, each of which is disposed on and presses against the rear side of the juncture of a pair of neighboring segments.

3. The frame as in claim 2, wherein an auxiliary connective slot is provided on the rear side of each segment, characterized in that as a segment connects with a neighboring segment, the corresponding two auxiliary connective slots are joined together and an auxiliary retaining unit connects two neighboring auxiliary connective slots.

4. The frame as in claim 3, wherein each auxiliary retaining unit comprises:
- an auxiliary upper retaining piece, wherein one or more threaded holes are provided in each auxiliary upper retaining piece and may fixedly connect two neighboring segments;
- an auxiliary lower retaining piece, disposed between the auxiliary upper retaining piece and the bottom of the auxiliary connective unit; and
- a plurality of auxiliary threaded fasteners, each of which is screwed into an auxiliary threaded hole so that the auxiliary threaded fastener presses against the corresponding auxiliary lower retaining piece and thus against the bottom of the corresponding auxiliary connective slot, characterized in that each auxiliary upper retaining piece presses against the upper edge of the auxiliary connective slot.

5. The frame as in claim 2, wherein each auxiliary retaining unit comprises:
- an auxiliary upper retaining piece, wherein one or more threaded holes are provided in each auxiliary upper retaining piece and may fixedly connect to neighboring segments;
- an auxiliary lower retaining piece, disposed between the auxiliary upper retaining piece and the bottom of the auxiliary connective unit; and
- a plurality of auxiliary threaded fasteners, each of which is screwed into an auxiliary threaded hole so that the auxiliary threaded fastener presses against the corresponding auxiliary lower retaining piece and thus against the bottom of the corresponding auxiliary connective slot, characterized in that each auxiliary upper retaining piece presses against the upper edge of the auxiliary connective slot that, in this manner, two neighboring segments may be connected.

\* \* \* \* \*